United States Patent [19]

Fuerter

[11] Patent Number: 6,125,109
[45] Date of Patent: Sep. 26, 2000

[54] DELAY COMBINER SYSTEM FOR CDMA REPEATERS AND LOW NOISE AMPLIFIERS

[75] Inventor: Matthew P. Fuerter, San Ramon, Calif.

[73] Assignee: Repeater Technologies, Sunnyvale, Calif.

[21] Appl. No.: 09/028,434

[22] Filed: Feb. 24, 1998

[51] Int. Cl.[7] ................................................. H04B 7/08
[52] U.S. Cl. .................. 370/315; 370/342; 370/334; 375/267; 375/347; 455/11.1; 455/101; 455/136; 455/138
[58] Field of Search ................................ 370/279, 334, 370/315, 335, 339, 342, 479, 492, 277; 375/267, 347; 455/11.1, 101, 132, 133, 136, 137; 458/138

[56] References Cited

U.S. PATENT DOCUMENTS

| | | | |
|---|---|---|---|
| 4,494,228 | 1/1985 | Gutleber | 370/18 |
| 4,730,310 | 3/1988 | Acampora et al. | 370/334 |
| 4,901,307 | 2/1990 | Gilhousen et al. | 370/18 |
| 5,101,501 | 3/1992 | Gilhousen et al. | 455/33 |
| 5,109,390 | 4/1992 | Gilhousen et al. | 375/1 |
| 5,109,501 | 4/1992 | Kaneko et al. | 395/425 |
| 5,233,626 | 8/1993 | Ames | 375/1 |
| 5,260,968 | 11/1993 | Gardner et al. | 375/1 |
| 5,280,472 | 1/1994 | Gilhousen et al. | 370/335 |
| 5,448,600 | 9/1995 | Lucas | 375/205 |
| 5,461,646 | 10/1995 | Anvari | 375/347 |
| 5,497,397 | 3/1996 | Hershey et al. | 375/259 |
| 5,504,936 | 4/1996 | Lee | 455/33.2 |
| 5,513,176 | 4/1996 | Dean et al. | 370/18 |
| 5,533,011 | 7/1996 | Dean et al. | 370/18 |
| 5,539,781 | 7/1996 | Matsuura | 375/347 |
| 5,563,610 | 10/1996 | Reudink | 342/375 |
| 5,577,047 | 11/1996 | Persson et al. | 370/95.3 |
| 5,584,057 | 12/1996 | Dent | 455/101 |
| 5,592,471 | 1/1997 | Briskman | 455/52.3 |
| 5,592,507 | 1/1997 | Kobayashi | 375/211 |
| 5,598,428 | 1/1997 | Sato | 375/206 |
| 5,602,834 | 2/1997 | Dean et al. | 370/335 |
| 5,640,386 | 6/1997 | Wiedeman | 370/320 |
| 5,652,765 | 7/1997 | Adachi et al. | 375/211 |
| 5,898,382 | 4/1999 | Treatch | 370/334 |

FOREIGN PATENT DOCUMENTS

| | | | |
|---|---|---|---|
| 0622918A2 | 11/1994 | European Pat. Off. | H04B 7/06 |
| 0693834A1 | 2/1995 | European Pat. Off. | H04J 13/02 |
| 0700174A1 | 8/1995 | European Pat. Off. | H04B 7/06 |
| 668 662 A1 | 8/1995 | European Pat. Off. | H04B 1/707 |
| 0736982A2 | 4/1996 | European Pat. Off. | H04B 7/26 |
| 0748074A2 | 6/1996 | European Pat. Off. | H04J 13/02 |
| WO 97/24818 | 7/1997 | WIPO | H04B 7/08 |

OTHER PUBLICATIONS

Zhang, C., Lam, W., and C. Ling, *A Low–Complexity Antenna Diversity Receiver Suitable for TDMA Handset Implementation*, 1997, IEEE.

*Primary Examiner*—Ricky Ngo
*Attorney, Agent, or Firm*—Michael A. Glenn; Don M. Hendricks

[57] ABSTRACT

Signal delay and combining techniques are used with multipath signals to provide signal diversity gain within CDMA over-the-air repeater and low noise amplifier systems. An incoming signal from a remote user is typically processed through two processing paths, wherein one path adds a delay to the processed signal. The two signal paths are then combined and filtered through a sharp band pass filter, preferably a SAW filter. In an over the air repeater, the filtered signal is retransmitted towards a CDMA rake receiver at a base station, which can process the multipath signal to produce a clean signal representation. In a low noise amplifier, the filtered signal is transferred directly into a base station or repeater. The use of SAW filters protect the latter stages of the low noise amplifier, and also protect the base station from out-of-band signal interference. A quadruple diversity low noise amplification system for base stations embodiment is also disclosed, which provides quadruple diversity and improved sensitivity for CDMA base stations.

39 Claims, 10 Drawing Sheets

DELAY COMBINER SYSTEM FOR CDMA REPEATERS AND LOW NOISE AMPLIFIERS

FIELD OF THE INVENTION

The invention relates to the field of communications repeater systems. More particularly, the invention relates to a CDMA repeater system having receive signal diversity, as well as multiple diversity delay combining low noise amplification systems which provide receive diversity dimensionality to conventional repeaters and base station receiver systems.

BACKGROUND OF THE INVENTION

Code division multiple access (CDMA) techniques are commonly used in communication systems, to allow communications between a large number of system users. Repeaters are used as an extension between mobile users and base stations in a variety of communication systems. Tower-top amplifiers are also used as an extension of many base station and repeater designs.

K. Gilhousen, R. Padovani, and C. Wheatley, *Method and System for Providing a Soft Handoff in Communications in a CDMA Cellular Telephone System*, U.S. Pat. No. 5,101,501 (Mar. 31, 1992) disclose a system for directing communications signals between a mobile user and cell sites, as the mobile user moves between cell site service areas.

K. Gilhousen, R. Padovani, and C. Wheatley, *Diversity Receiver in a CDMA Cellular Telephone System*, U.S. Pat. No. 5,109,390 (Apr. 28, 1992) disclose a spread spectrum receiver subsystem for utilization in a CMDA cellular telephone system.

D. Reudink, *Narrow Beam Antenna Systems with Angular Diversity*, U.S. Pat. No. 5,563,610 (Oct. 08, 1996) discloses a receiving system which includes at least one antenna providing a plurality of antenna beams. A first antenna branch processes a first plurality of signals within a first plurality of antenna beams. The first processing branch includes a plurality of delay paths, each receiving one of the first plurality of signals. The first processing branch also includes a combiner for combining the signals after output from the delay paths. A second antenna branch processes a second plurality of signals within a second plurality of antenna beams. The second processing branch includes a plurality of delay paths, each receiving one of the second plurality of signals. The second processing branch also includes a combiner for combining the signals after output from the delay paths. A CDMA receiver has a first port coupled to an output of the first processing branch, and a second port coupled to an output of the second processing branch.

R. Dean, F. Antonio, K. Gilhousen, and C. Wheatley, *Dual Distributed Antenna System*, U.S. Pat. No. 5,533,011 (Jul. 02, 1996) disclose a distributed antenna system for "providing multipath signals which facilitate signal diversity for enhanced system performance. Each node of the antenna at a common node provides a path having a different delay to the base station". While a "direct" connection is established between a distributed antenna system and a base station, wherein the distributed antenna system provides multipath signals (increasing the dimensionality) to facilitate signal diversity, the system does not disclose the use of diversity within a repeater system.

R. Dean, P. Antonio, K. Gilhousen, and C. Wheatley, *Dual Distributed Antenna System*, U.S. Pat. No. 5,513,176 (Apr. 30, 1996) disclose a distributed antenna system that is utilized in a system for "providing multipath signals which facilitate signal diversity for enhanced system performance. Each node of the antenna comprises more than one antenna. Each node at a common node provides a path having a different delay to the base station".

While prior art diversity techniques are typically used to expand system capacity, they fail to disclose the use of diversity within the primary antenna of a CDMA repeater or a tower-top amplifier.

While the prior art discloses the use of diversity for in-building applications relative to a base station, they fail to disclose delay techniques to provide diversity within an over-the-air CDMA repeater.

The disclosed prior art systems and methodologies thus provide basic distributed antenna systems, but fail to provide a diversity within a CDMA receive diversity system within an over the air repeater system, and also fail to provide delay combining diversity for a tower top or low noise amplification system. The development of such a repeater system would constitute a major technological advance.

SUMMARY OF THE INVENTION

Signal delay and combining techniques are used with multipath signals to provide signal diversity gain within CDMA over-the-air repeater and low noise amplifier systems. An incoming signal, such as from a remote user, is typically processed through two processing paths, wherein one processing path adds a delay to the processed signal. The two signal paths are then combined and preferably filtered through a sharp band pass filter, preferably a SAW filter. In an over the air repeater, the filtered signal is retransmitted towards a CDMA rake receiver at a base station, which processes the multipath signal to produce a clean signal representation. In a low noise amplifier, the filtered signal is transferred directly into a base station or repeater. The preferred use of SAW filters protects the latter stages of the low noise amplifier, and also protects base stations from out-of-band signal interference. A quadruple diversity delay combining low noise amplification system for direct connection to base stations is also disclosed, which increases the receive diversity dimensionality (the number of receive paths) from two to four.

DETAILED DESCRIPTION OF PREFERRED EMBODIMENTS

Figure 1:
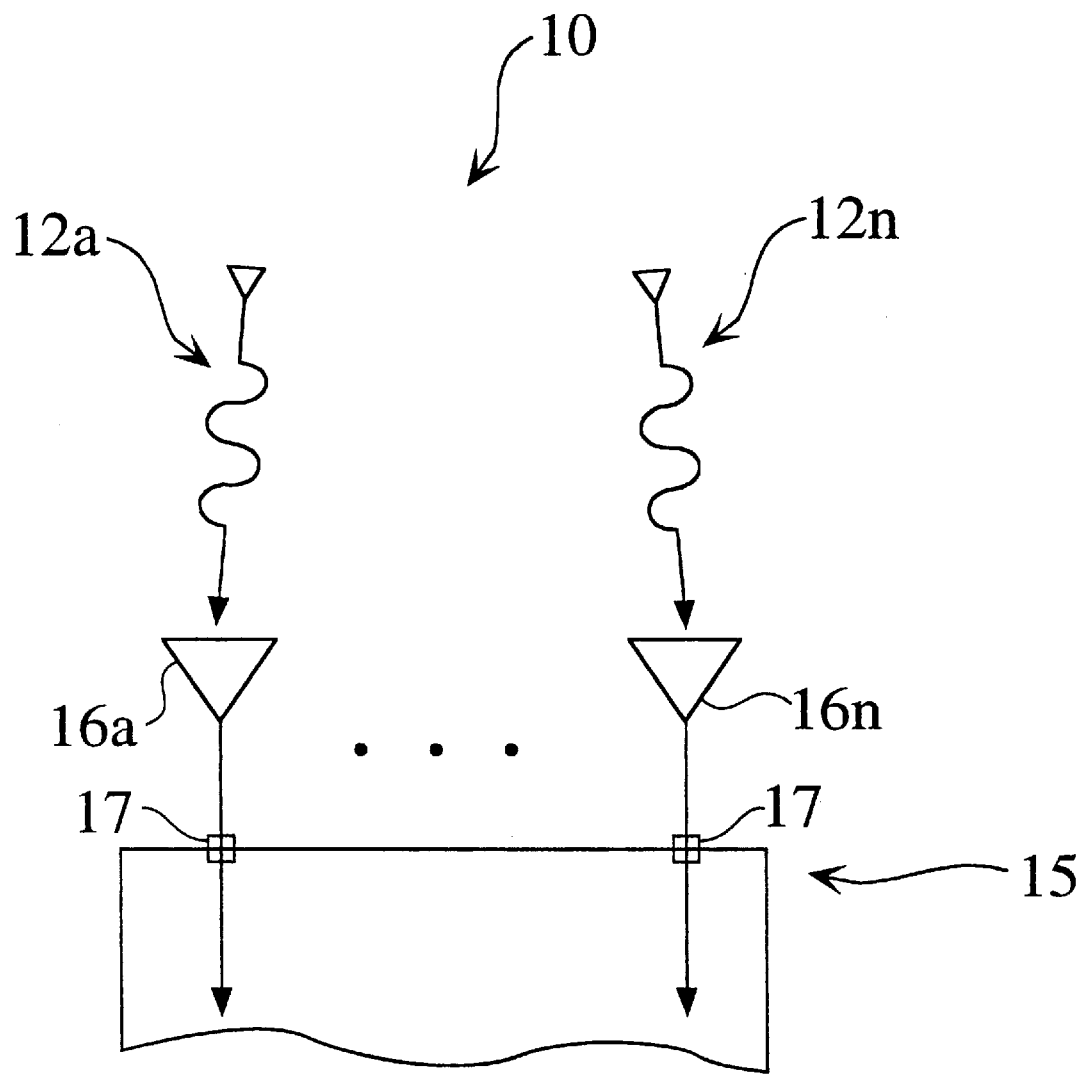
FIG. 1 shows a multipath input signal having a plurality of decorrelated signal paths received by a CDMA antenna system.

FIG. 1 shows an antenna assembly 15, and its interaction with an incoming signal 12. The antenna assembly 15 consists of a plurality of antennas 16a–16n, each of which are connected to antenna inputs 17. The incoming signal 12 is a fading signal, meaning that the amplitude of the signal is rapidly changing due to propagation effects. This signal 12 is can be received simultaneously by a plurality of antennas 16a–16n. The instantaneous amplitude of the signal 12 at any given point in space (in this case the space that is occupied by the antenna assembly 15) will be different from the instantaneous amplitude at any other point in space. The instantaneous amplitude at any given point is space is also dependent on the polarization of each antenna 16, and the direction that each antenna 16 is pointed. This is shown in FIG. 1 as a fading signal 12, consisting of a plurality of signals 12a–12n. The instantaneous amplitude of the fading signals 12a–12n are generally different. This relationship between the signals 12a–12n is called decorrelation.

The antennas 16a–16n are configured such that the fading processes affecting the signals received by each antenna 16 are not correlated. That is, the signals 12 received on each individual antenna 16a–16n fade independently of the signals on the other n–1 antennas 16. When this relationship exists between a set of signals 12, they are said to be mutually decorrelated. The antennas 16a–16n must be configured so that this mutual decorrelation exists between the signals 12. There are many different ways to configure the plurality of antennas 16a–16n such that the mutually decorrelated relationship exists between the signals 12a–12n. Any configuration which achieves this relationship is acceptable.

As described above, the instantaneous amplitude of the signals 12a–12n is a function of position, polarization, and arrival direction. Thus spatial separation, polarization separation, angular separation, or any combination of these, can be used to provide signals 12a–12n which possess the mutually decorrelated relationship.

Two common techniques for achieving mutual decorrelation in a mobile radio environment are spatial separation and polarization separation, which take advantage of the fact that position and polarization separation provide decorrelated signals. When spatial separation is used to provide decorrelated signals, the antennas 16 must typically be separated by 10–20 wavelengths to achieve satisfactory decorrelation. When polarization separation is used, the antennas 16 are polarized such that the polarization between the antennas 16 is orthogonal.

In a CDMA system, a demodulator is used to optimally combine these signals 12a–12n into a composite signal, which is much more robust than any one of the individual signals 12a–12n. This process of receiving multiple decorrelated signals and combining the signals 12a–12n is called receive diversity. Since the composite signal is more robust, than the individual received signal 12a–12n, the signal to noise ratio requirement for proper system performance is smaller than that required by a system that does not use receive diversity techniques. This reduction in signal to noise ratio increases the capacity of CDMA systems, and increases the range of CDMA repeaters and base stations.

The signal delay and combining techniques can be used within either a CDMA over-the-air repeater, or a dual diversity delay combining low noise amplification system 46 (FIG. 3) to provide receive diversity to a conventional CDMA over-the-air repeater. The disclosed techniques can also be used within a quadruple diversity delay combining low noise amplification system 150 (FIG. 7) to further increase the receive diversity dimensionality.

Figure 2:
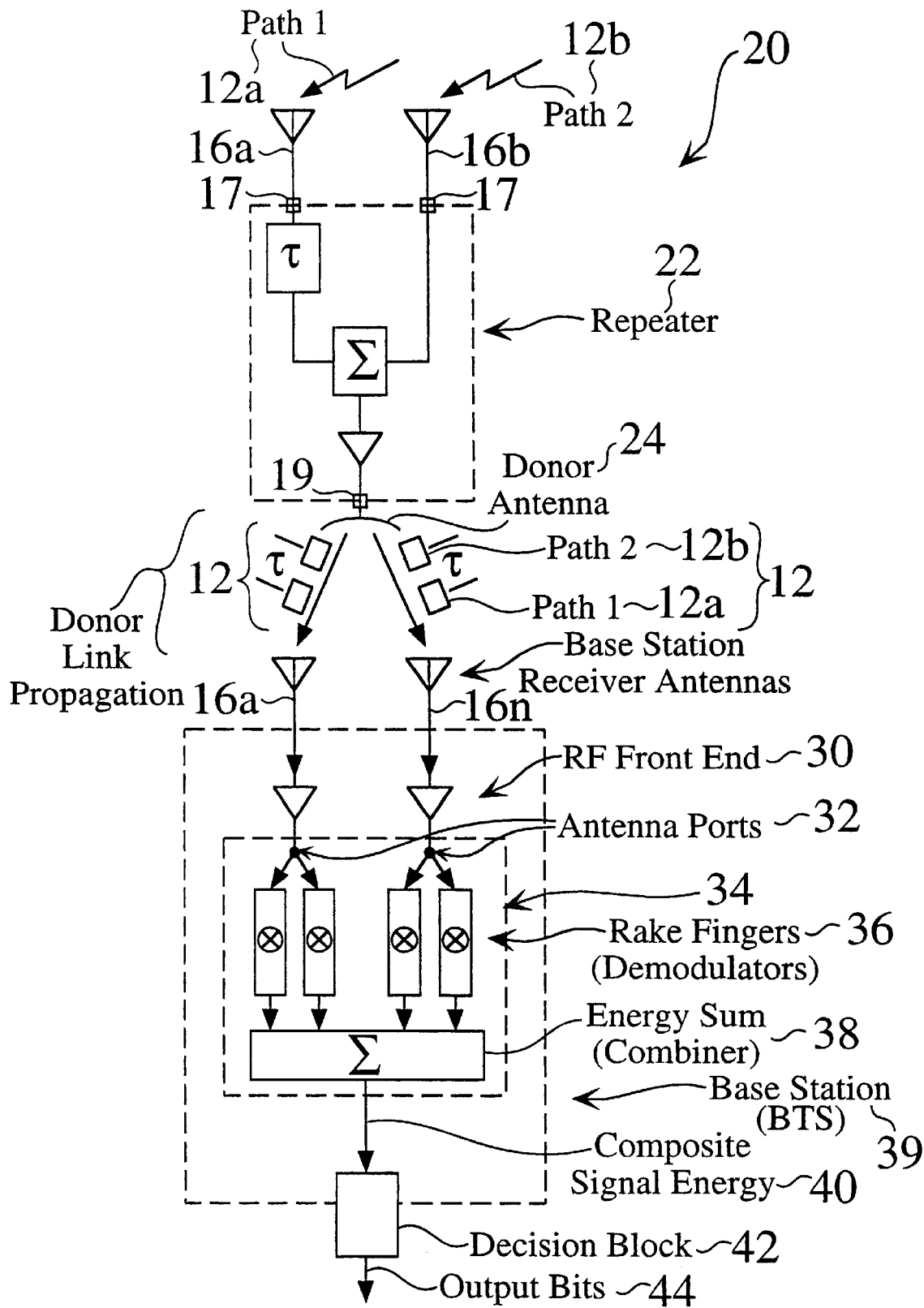
FIG. 2 shows the interaction between a CDMA repeater and a base station.

Base Station Multipath Demodulator. FIG. 2 shows the reverse path interaction 20 between a repeater 22 and a base station 39. The multipath signal 12, having decorrelated paths 12a and 12b, is transmitted toward the base station, where it is processed and eventually demodulated by a multipath demodulator, usually a rake receiver 34.

The antennas 16 used in the present invention can either be orthogonal in polarization, or they can be spatially separated, typically by 10 to 20 wavelengths, to provide the required decorrelation for diversity gain.

The reverse path (from a mobile station to a base station) uses a noncoherent modulation scheme known as 64-ary orthogonal modulation. The base station 39 uses a rake receiver 34 to demodulate the incoming signal 12. The rake receiver 34 demodulator is preferred for the multipath environment.

The rake receiver 34 simply adds the modulation symbol energy from each rake finger 36, and processes a decision based on the total energy associated with each modulation symbol. This type of multipath demodulator 36, although not optimal, is only slightly less effective than an optimal multipath demodulator (several tenths of a dB). For more details regarding rake receiver design, refer to A. J. Viterbi, *CDMA Principles of Spread Spectrum Communications*, Addison-Wesley 1995.

The rake receiver demodulator 34 is accurately modeled as a maximal ratio combiner, when the average signal power on the individual demodulator rake fingers 36 are the same. This equivalence of inter-branch signal powers is typical for most embodiments of the present invention.

The maximal ratio combiner 38 combines the energy associated with each of the incoming signal paths 12a, 12b, effectively yielding the sum of the per finger per bit energy to noise density ratios, $E_b/I_o$. The characteristic performance of the maximal ratio combiner 38 is given by:

$$\left[\frac{E_b}{I_o}\right]_{Total} = \sum_{i=1}^{N} \left[\frac{E_b}{I_o}\right]_i \qquad (1)$$

$E_b$ represents the amount of energy associated with each information bit (Joules), and $I_o$ represents the noise plus interference power density (Watts/Hz). The ratio $(E_b/I_o)_i$ represents the ratio of energy per information bit to noise plus interference density, for a single path 12.

The output 40 of the combiner 38 is the total per bit energy to noise density ratio $(E_b/I_o)_{Total}$. The error rate of the system demodulator, for a fixed set of channel fading conditions and diversity configuration, is inversely proportional to the total per bit energy to noise density ratio $(E_b/I_o)_{Total}$. The lower this ratio, the larger the error rate.

The output 40 of the combiner 38 is fed to a decision device 42, which estimates which modulation symbol is sent. Once the modulation symbol is determined, the actual information bits are derived.

The multipath demodulator 34 in one embodiment has four fingers 36, each of which can track and demodulate a single path 12. One finger 36 is assigned to each available path 12. The rake receiver 34 can only differentiate paths 12 which are either on different RF branches, or those which are on the same RF branch but are time dispersed from each other. Paths 12 are typically associated with antennas 16. Thus, one rake finger 36 is typically locked onto each antenna 16.

The antennas 16 are configured to achieve a relationship of mutual decorrelation between the signals 12. There are numerous ways to configure the antennas 16 such that the mutually decorrelated relationship exists among the signals 12. Any configuration which achieves a relationship of mutual decorrelation among the signals 12 is acceptable.

As described above, the instantaneous amplitude of the signals 12a–12n is a function of position, polarization, and arrival direction. Thus spatial separation, polarization separation, or angular separation, or any combination of these, can be used to provide signals 12a–12n which possess a mutually decorrelated relationship.

The two of the most common techniques for achieving mutual decorrelation in the mobile radio environment are spatial separation and polarization separation, which taking advantage of the fact that position and polarization separation provide decorrelated signals. When spatial separation is used to provide decorrelated signals, the antennas are typically be separated by 10 to 20 wavelengths, to achieve satisfactory decorrelation. When polarization separation is used, the antennas are polarized such that the polarization between the antennas is orthogonal.

The required total per bit energy to noise density ratio $(E_b/I_o)_{Total}$ is usually specified for a given level of system performance under a set of predefined conditions, which include the correlation between paths 12a–12n, the number of paths 12a–12n, the speed of a mobile user, and the channel conditions encountered. Almost always, the channel conditions are assumed to be a time dispersive channel, with an amplitude that is Rayleigh distributed. The speed of a mobile user is usually assumed to be that associated with the type of morphology the mobile user is operating in. The correlation between paths 12a,12n is almost always considered to be zero (independent fading paths). This leaves only the number of paths 12a–12n and the mobile speed as the factors which determine the total per bit energy to noise density ratio $(E_b/I_o)_{Total}$.

For a fixed speed of a mobile user, the $(E_b/I_o)_{Total}$ requirement is simply a function of the number of paths. For example, in suburban morphology with one path, the $(E_b/I_o)_{Total}$ requirement for a 1% error rate, is 14 dB. For two paths the $(E_b/I_o)_{Total}$ requirement is 10 dB, and for four paths it is 9 dB. The reduction in the $(E_b/I_o)_{Total}$ is attributed to the diversity gain associated with the introduction of additional paths for demodulation. Since a typical base station 39 has at least two antennas 16, there is always a minimum of two paths (independent fading paths) to demodulate. Thus, for the worst case, the $(E_b/I_o)_{Total}$ requirement is 10 dB.

For a conventional repeater configuration, there is only a single path 12 returned to the base station 39 for demodulation. As shown in the example above, the $(E_b/I_o)_{Total}$ required is 14 dB, which is 4 dB larger than the $(E_b/I_o)_{Total}$ required for operation on the base station 39. This, however, is not an optimal configuration for a repeater, since the required $(E_b/I_o)_{Total}$ can be reduced by providing a second independent fading path for demodulation. The use of a second independent fading path reduces the required $(E_b/I_o)_{Total}$ to 10 dB, which is the same as that required for operation on a base station 39.

The present invention effectively provides a second path 12b for the base station rake receiver 34 to demodulate. This allows the performance of the repeater 22 to be optimal. In the case where the repeater 22 provides the second path 12b to the base station 39, the required $(E_b/I_o)_{Total}$ is exactly the same as the base station 39, which is 10 dB.

In a basic embodiment of the present invention, two decorrelated signal paths 12a,12b are captured (with two antennas 16), which are both fed back to the base station rake receiver 34, over a single RF channel. The process used to accomplish this is a delay combining process, which time multiplexes the two decorrelated signals, by introducing a greater delay to one of the paths 12a or 12b as compared to the other. The time delay introduced to one of the paths 12a or 12b is large enough, such that the signals are no longer coherent. The excess delay is more than two chips, and the resulting code offset ensures that the cross correlation between the two paths 12a, 12b is zero. Thus the two paths 12a, 12b will appear as noise to each other.

Since these two paths 12a, 12b are dispersed in time, the rake receiver 34 is able to lock onto and demodulate both paths 12a, 12b, to provide the desired diversity gain.

The process used by the rake receiver 34 to find the two paths 12 comprises the following steps:

i) finding the time of arrival (TOA, relative time delay) and locking onto one of the paths 12a (usually the earliest one);

ii) searching around the first path 12a (in time) for additional multipaths 12b–12n;

iii) finding and locking onto the second path 12b; and iv) demodulating the first 12a and second path 12b.

Thus the rake receiver 34 now has at least two decorrelated paths 12a,12b to demodulate, and the required $(E_b/I_o)_{Total}$ is the same as that of the base station 39.

Figure 3:
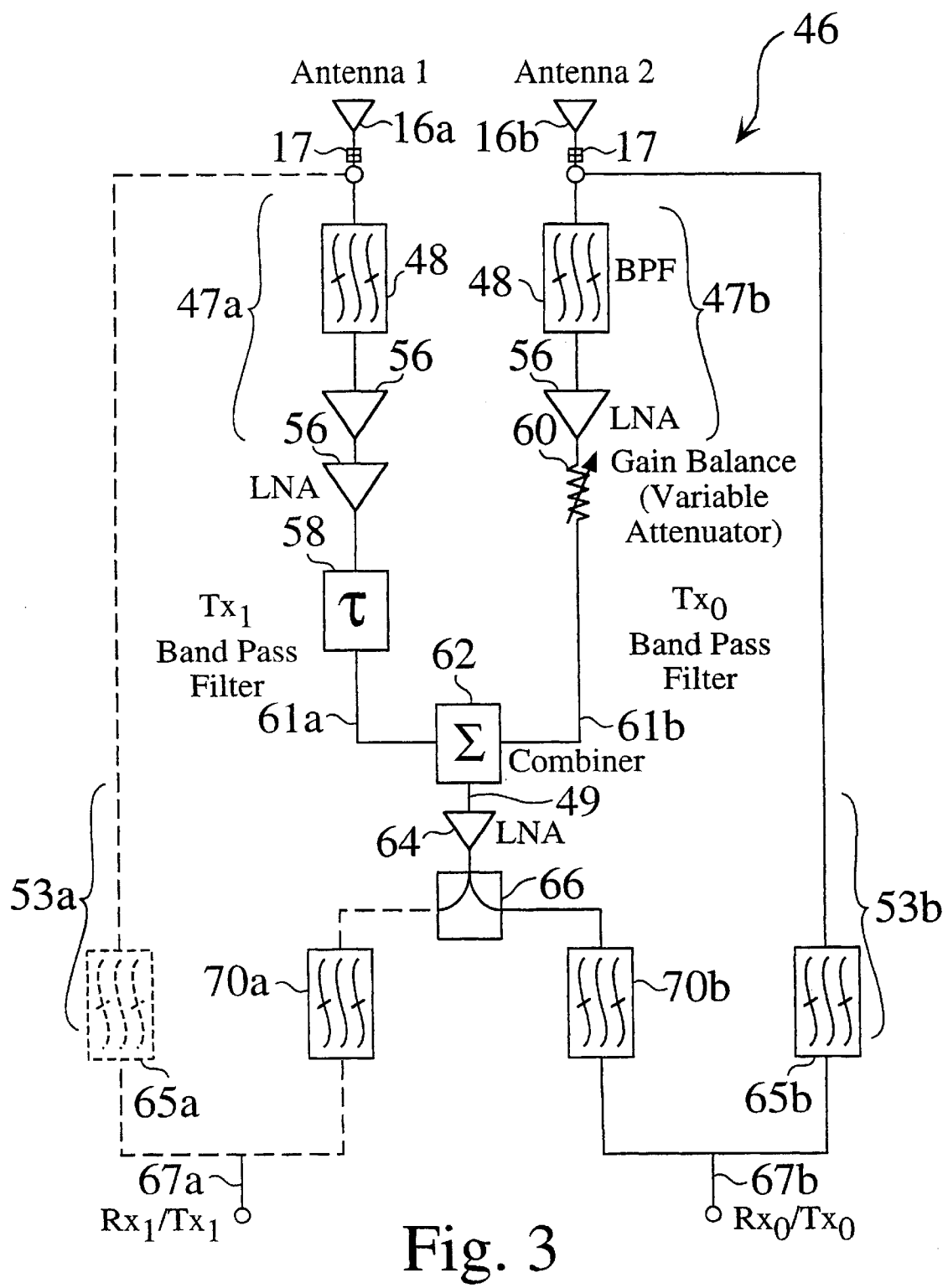
FIG. 3 is a block diagram of a dual diversity delay combining low noise amplifier system for use in association with a conventional (non-diversity) repeater to provide receive diversity.

Dual Diversity Delay Combining Low Noise Amplification System. FIG. 3 is a block diagram of a dual diversity delay combining low noise amplification system 46 (tower mounted or otherwise), for use in association with a conventional (non-diversity) repeater, to provide receive diversity. The dual diversity delay combining low noise amplification system 46 is used to upgrade a conventional (non-diversity repeater) to a dual diversity repeater, by providing dual branch diversity. The dual diversity delay combining low noise amplification system 46 can either be mast mounted, or can be ground mounted near a conventional repeater.

The main attribute of the dual diversity delay combining low noise amplification system 46 is the delay combiner, which time multiplexes two receive paths 47a and 47b onto one RF path 49. This capability allows a conventional repeater to function as a diversity repeater, when used in conjunction with the dual diversity delay combining low noise amplification system 46. Two antennas 16a and 16b are connected to antenna connectors 17, and are implemented in a spatial and/or a polarization diversity configuration, to capture two decorrelated fading paths 12a, 12b. The two signals associated with these paths are preferably fed directly from the antennas 16a, 16b into band pass filters 48, which provide protection from adjacent band radio signals. This process is called preselection, and the band pass filters 48 are considered to be preselector filters 48.

In a preferred embodiment of the dual diversity delay combining low noise amplification system 46, after the preselector filters 48, there are low noise amplifiers (LNAs) 56, which amplify the signal, in an effort to minimize signal to noise reduction in the later stages, especially the time delay element in the path associated with the first antenna 16a.

After the low noise amplifiers 56, the signal from the first antenna 16a is fed to a time delay element 58, and the signal from the second antenna 16b is preferably fed to a variable attenuator 60. The delay element 58, which is typically a SAW device, provides a differential delay to the signal from the first antenna 16a, as compared to the second antenna 16b. The time delay allows the base station rake receiver 34 to demodulate both paths 12a, 12b, by displacing the paths 12a, 12b in time. The magnitude of the delay must be greater than 2 chip periods (e.g. approximately 1.8 microseconds for IS-95 and J-STD-008). The desired delay magnitude varies with the technology employed (e.g. wide band CDMA). On the second branch path 47b, a variable attenuator 60 is preferably used to balance the gain between the branches 47, which is important for optimal system performance.

After the delay element 58 on the first branch 47a, and after the preferred variable attenuator 60 on the second branch 47b, the signals 61a and 61b are summed in a combiner 62. The combiner 62 yields the power sum of the two processed signals 61. Since the processed signals 61a and 61b are time offset from each other by more than 1 chip, the signals 61 are no longer coherent. This is due to the nature of the pseudonoise (PN) code used to modulate the reverse path (up-link) signal.

This code is specifically designed to provide minimum correlation for a one chip or greater, offset. Since the processed signals 61a and 61b are no longer coherent, they interfere with each other on a random broad-band basis, thus creating a power sum, exactly the same way noise powers sum. Both processed signals (displaced in time) appear at the output of the combiner 62, and either signal looks like noise to the other signal. In this example, this process reduces the signal to noise ratio by 3 dB. However, this loss is gained back by the action of the rake receiver 34 at the base station 39.

Following the combiner 62, a low noise amplifier 64 is preferably used to increase the signal level, in preparation for losses which can result in latter stages. The low noise amplifier 64 is also preferably used to maintain the signal to noise ratio of the signals.

The next stage in a preferred embodiment is a receive power splitter 66, which provides an option of system expansion. The receive power splitter 66 is used to split the signal between two paths, one to the RX0/TX0 port 67b, and one to the RX1/TX1 port 67a. This configuration allows for the operation of two repeaters from one dual diversity delay combining low noise amplification system 46, which is a preferred method of system expansion. The duplex configuration, which is a conventional antenna system configuration for repeater and base station systems, is defined as the use of a common antenna and cable for both receiving and transmitting, since it minimizes the number of antenna system components required.

In a preferred embodiment in which a receive power splitter 66 is used, the signal is fed from the two outputs of the receive power splitter 66 to two separate two-stage cascade filters 70a, 70b. In an embodiment in which a receive power splitter 66 is not used, the signal is fed directly from the output of the low noise amplifier 64 to a single, two-stage cascade filter 70.

Figure 4:
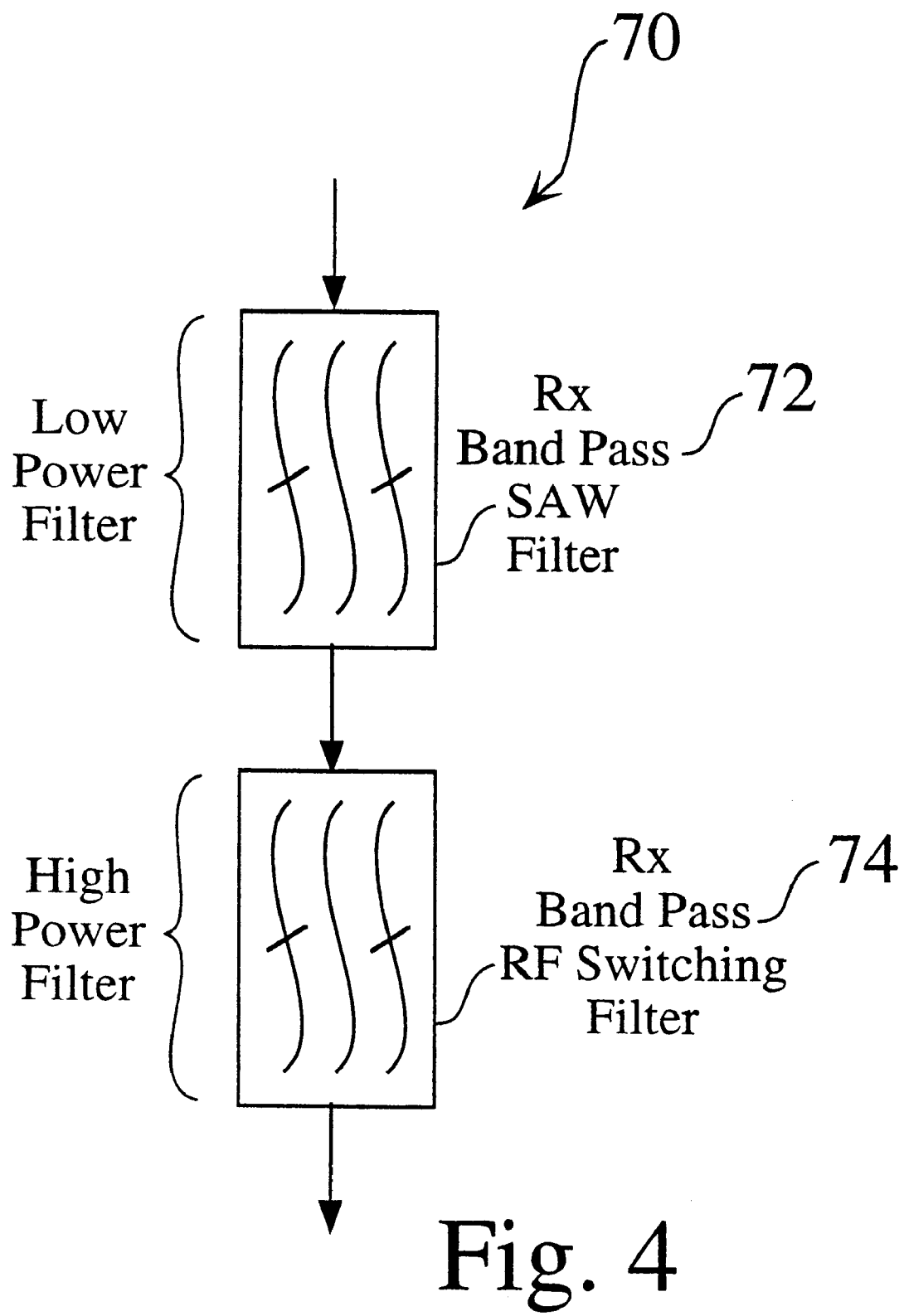
FIG. 4 is a detailed view of a two stage band pass filter cascade.

Two stage cascade filters 70 are each comprised of a sharp receive band-pass filter 72 and a RF switching filter 74, as shown in FIG. 4. The two stage cascade filter 70 provides protection for the repeater from strong out of band interference signals, which are prone to cause intermodulation distortion (IMD). The two stage cascade filter 70 protects the repeater, by increasing the out-of-band input intercept point.

The two-stage cascade filter 70 is comprised of two filters. The first filter is a sharp pass-band filter 72 which provides protection from out-of-band interference, as described above. The second filter is a high power receive (Rx) band-pass filter 74. The Rx band-pass filter 74 provides protection to the sharp pass-band filter 72 from high power transmitter signals.

Placement of dual diversity delay combining low noise amplification system 46, which in a preferred embodiment includes two-stage cascade filters 70, in front of the conventional repeater reduces the IMD contribution of the conventional repeater to insignificant levels, leaving only the IMD products generated in the dual diversity delay combining low noise amplification system 46. This increases the out-of-band input third order intercept point by 15 dB.

At this point in the dual diversity delay combining low noise amplification system circuit 46, all the signal processing required for the receive system to operate is complete. An optional receive power splitter 66 is used in a preferred embodiment, as described above, to provide two outputs for system expansion. If the receive power splitter 66 is used, there are two filter cascades 70, one for each receive power splitter output. These filters, besides serving as a protection from interference, also serve as receive side duplex filters (carrier rejection filters). Cascade filters 70, in conjunction with preferred preselector filters 48 and TX band-pass filters 65, provide the RF switching and filtering required to operate in the duplex configuration.

The preferred duplex configuration allows for a single cable, which carries both transmitter and receiver signals, and is connected to either the RX0/TX0 port 67b or the RX1/TX1 port 67a. The duplex configuration provides a bypass for the transmitter signals around the receiver's circuitry. The specific configuration shown in FIG. 3 is a double duplexed configuration, since the signals are unduplexed at the donor input/output ports 67a, 67b (bottom RX0/TX0 and RX1/TX1) and are then re-duplexed before the subscriber antenna ports 17.

Band-pass Filters. Band pass filters 48, 72, 103 are designed to attenuate LO leakage, as well as any other spurious signals that result from the mixing processes that precede the band pass filter 48, 72, 103.

The SAW filter 72 preferably used in the dual diversity delay combining low noise amplification system 46, as shown in FIG. 4, is used to improve intermodulation performance (increased out of band input intercept point).

The analogous preferred device in the repeater 22, 80 is the channel select filter. This filter provides the same effect, although its primary function is to provide individual channel selection (isolation), so that the repeater 22, 80 can isolate and repeat only the channel that the system operator desires.

Figure 5:
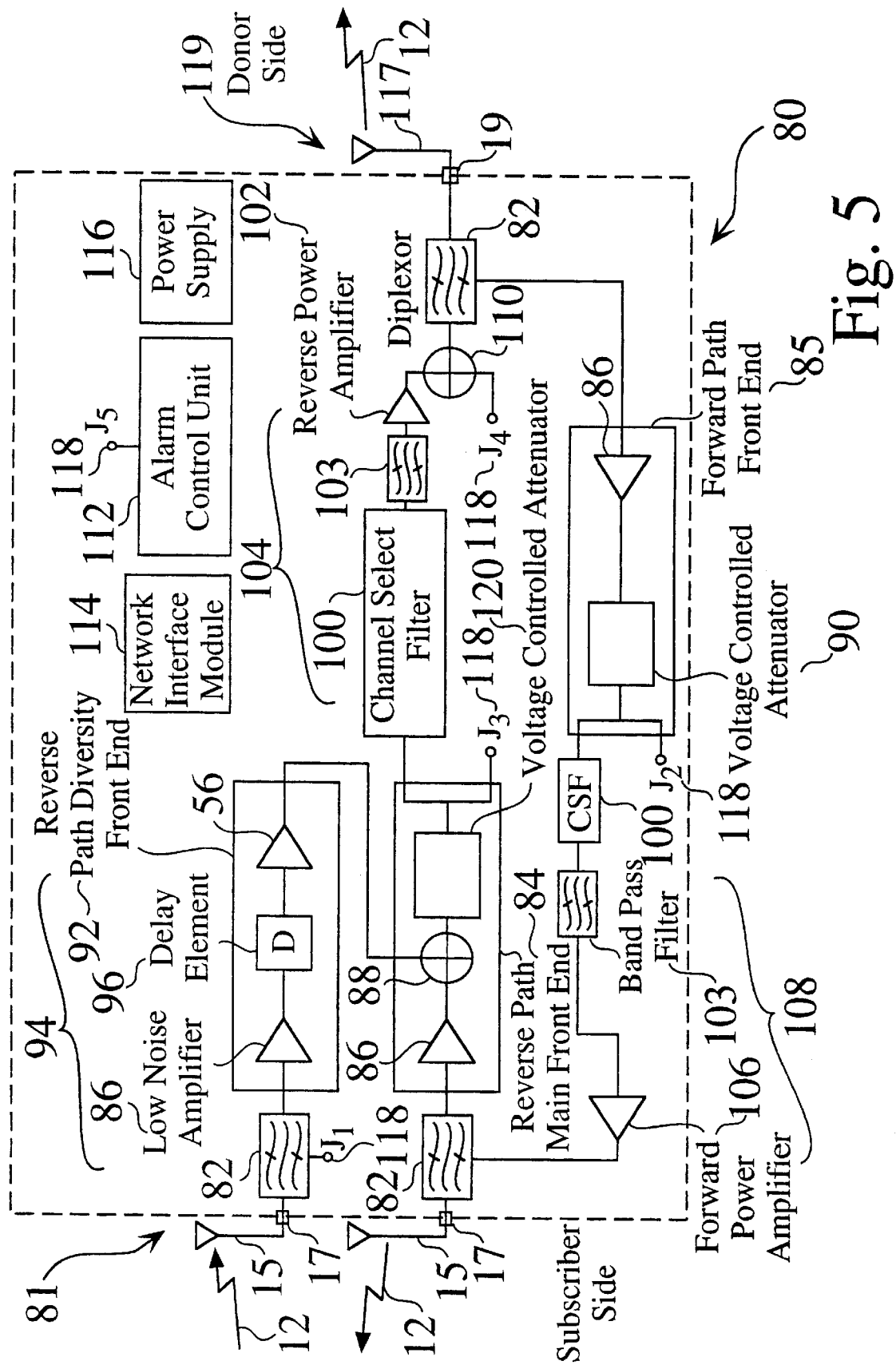
FIG. 5 is a detailed block diagram of a CDMA repeater system.

Repeater. FIG. 5 is a detailed block diagram of the primary enclosure housing a CDMA repeater system 80. By using a repeater 80 to provide diversity, a single time multiplexed signal 12, consisting of at least two independent fading paths 12a, 12b, is transmitted to a base station 39, which typically includes a rake receiver 34. The rake receiver 34 at the base station 39 demodulates the time multiplexed signal 12 consisting of at least two paths 12a, 12b.

A repeater in a conventional CDMA system has only one input path or signal branch, and has no signal diversity. As the single input path fades, there's not a second path there to pick up if the first one is down. The signal to noise requirement, which includes a fade margin, is large. This results in both a large link budget loss and a diminished sector capacity from a conventional repeater. The link budget for a conventional repeater is reduced by 3 to 4 dB, and the sector capacity is also reduced by 3 to 4 dB, when compared to a diversity repeater. These are significant disadvantages to conventional repeaters, particularly if the conventional repeater is used to extend the range of a sector, but fails to maintain capacity.

The wireless repeater 80 receives mobile signals from mobile users MS, and does not act as a repeater between one stationary base station 39 and another stationary base station 39. The wireless repeater 50 is field based, and picks up mobile signals, acting like a base station or as an extension of a base station, using an over-the-air interface, in its own frequency. The wireless repeater 80 doesn't require extra spectrum, and extends the effective service area of a cell site.

The diversity techniques employed in the present invention only work with CDMA systems, since CDMA systems are able to recognize and demultiplex the delay imposed between the paths 12*a*, 12*b* within the multiplex signal 12.

The reverse path (up-link) operation of the repeater 80 is shown in FIG. 5, wherein mobile subscribers MS send out signals 12 to the antenna assembly 15 on the subscriber side (re-radiating side) of the repeater 81. A donor antenna assembly 117 is located on the donor side 119, to transmit processed signals to a base station 39. This processed signal is received by antennas 16*a* and 16*b* at the base station 39. On the subscriber side 81, there is either a dual polarization antenna assembly 15, or a spatially separated vertically polarized antenna assembly, or any combination of these two schemes. The signals go through the diplexor 82, which acts as a filter to separate the transmit and receive signals 12, into two low noise amplifiers 86. The first low noise amplifier 86, in conjunction with the delay element 96, comprise the reverse path diversity front end 92. The reverse path diversity front end 92 is used for low noise amplification and signal delay. The reverse path main front end 84 is comprised of a low noise amplifier 86, a combiner 88, and a voltage controlled attenuator 120. The delay is added to the signal path associated with the reverse path diversity front end 92, as discussed above in relation to the dual diversity delay combining low noise amplifier system 46 for repeater applications. The gain differential is balanced between the reverse path main front end 84 and the reverse path diversity front end 92, measured between the input ports and the output of the combiner 88.

The paths 12*a*, 12*b* are then summed 88 and are preferably fed to a channel select filter 100, which has a sharp SAW filter to eliminate out-of-band signals. The unwanted spurious signals and LO leakage at the output of the channel select filter 100, which result from signal conversion processes, are preferably filtered out by a band pass filter 103. The signal is then preferably sent through a power amplifier 102, through a diplexor 82, and is then transmitted to the base station 39 through donor antenna assembly 117. At this point, there are two paths 12*a* and 12*b* separated in time, as shown in FIG. 1 and FIG. 2. While the combined signal 12 is drawn showing two path elements 12*a*, 12*b*, the elements are not necessarily discrete.

On the forward direction (down-link) side of the circuit, a transmitted signal 12 comes from the base station 39 on the donor side 119, to the diplexor 82, and is separated out, wherein part of the signal 12 is directed through the forward path front end 85, which includes a low noise amplifier 86 and a voltage controlled attenuator 90. The signal is then directed through a channel select filter 100, a band pass filter 103, a forward power amplifier 106, a diplexor 82, and is then transmitted on the subscriber side of the repeater 80, on either of the antennas 16 of antenna assembly 15.

The combiner 110 shown on the donor side 119 allows a second carrier reverse path (up-link) transmit path to be added, while J1 and J2 allow a second CDMA RF carrier path for the forward path (down-link). While the basic embodiment only requires one carrier, a typical CDMA spectrum currently has a plurality of RF carriers. Therefore, alternate embodiments of the invention can use a plurality of carrier transmit paths.

Figure 6:
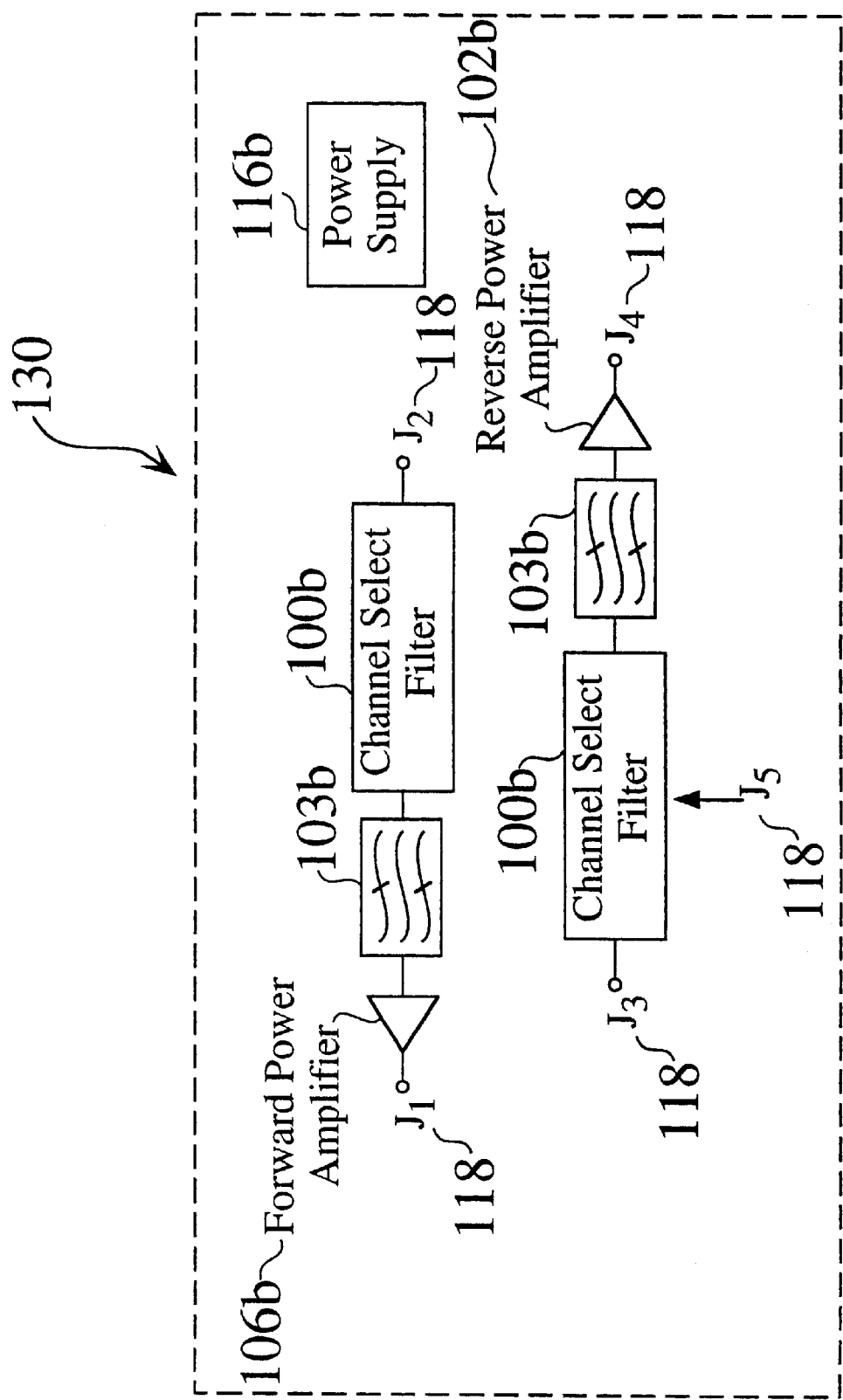
FIG. 6 is a block diagram of a secondary growth enclosure for a second CDMA carrier.

System Advantages. The wireless repeater 80, such as a personal communications services (PCS) repeater 80, provides many advantages over prior art repeater systems. The main advantage over the prior art is the reverse path receive (up-link) diversity feature. This feature improves system sensitivity and call quality, and maintains normal system capacity, which are significant improvements over the prior art. The wireless repeater 80, which in a preferred embodiment is channel selective, is optimized for CDMA applications, is designed to have a low up-link noise figure, and high down-link transmit power that is close to base station power, with diversity paths in the up-link. The basic embodiment of the wireless repeater 80 is equipped with one CDMA frequency carrier. In an alternate embodiment of the repeater, a growth enclosure is included for a second CDMA carrier 130, as shown in FIG. 6, with J-connections 118 between the first carrier 80 and the second carrier 130.

Repeater System Architecture. A block diagram for the primary enclosure housing a first CDMA frequency carrier for the channelized air-to air wireless repeater 80 is shown in FIG. 5. The repeater 80 is typically connected, through subscriber antenna ports 17, to a single antenna assembly 15 on the subscriber side 81, and to a single donor antenna assembly 117, through donor antenna ports 19, on the donor side 119. This minimizes the number of antennas required, and minimizes the visual impact of a given site, which is a major concern during site development processes. The repeater 80 is also considered to be non-translating, since it does not shift the received frequency to a different transmitter frequency for the re-radiated signal or donor links. Non-translating repeaters 80 are also known as on-frequency repeaters 80.

The diplexor 82 provides common access to a single antenna 15 for both uplink and downlink signals. The isolation between the transmission (TX) and reception (RX) paths is sufficient to avoid both receiver overload and receiver desensitization caused by noise from the transmitter. The diplexor 82, as well as propagation losses, provides this isolation.

The main front end module (MFE) 84 can be used as the front end of the receive path, for both uplink signals 12 and downlink signals 12. A combiner 88 is included after the preferred low noise amplifier (LNA) 86, to combine the delayed diversity path 12. A combiner 86 is not required in the downlink circuitry. A voltage controlled attenuator (VCA) 90,120 is used for automatic level control (ALC), for protection of the repeater 80 against input overload conditions, and for calibration of the overall gain.

The reverse path diversity front end (DFE) 92 is the front end of the reverse path diversity circuitry 94. A delay element 96 is inserted after a preferred low noise amplifier 86, to provide at least two chip periods of time delay, for discrimination of the signal by the rake receiver 34. The output is preferably further amplified 56 to compensate the loss, and is combined with the other receive signal via the combiner 88 in the reverse path main front end 84.

In a preferred embodiment of the repeater 80, a channel select filter (CSF) 100 tunes the local oscillator to a specific channel, downconverts the RF signal to IF, provides channel filtering, and then upconverts the signal back to RF. The channel select filter 100 also provides gain adjustment for the wireless repeater 80.

A preferred reverse power amplifier (RPA) 102 provides signal amplification for the reverse path (up-link). Similarly, a preferred forward power amplifier (FPA) 106 provides high power amplification for the forward path (down-link) 108.

An alarm control unit (ACU) 112 controls and monitors all the modules within a preferred embodiment of the repeater 80. The alarm control unit 112 also communicates with the network or local craft via control software.

As discussed above, a band pass filter 103 is used to filter out image and local oscillator signals at the output of the channel select filter 100, to avoid radiation of unwanted signals.

The power supply PS 116 provides direct current (DC) power to all modules. A preferred network interface module 114 serves as an interface to the network, for alarm reporting, control, and monitoring. J-connections 118 are provided in the growth enclosure 130 for the second CDMA carrier.

In a preferred embodiment of the invention, a second CDMA carrier is added, by connecting a growth enclosure to the primary enclosure of the repeater 80, as shown in the block diagram of FIG. 6. The second carrier has its own forward power amplifier 106b and reverse power amplifier 102b, to maintain the same downlink transmit power as the first carrier 80.

Repeater Process. The basic repeater process comprises the following steps:

i) receiving a signal 12 through a receiving antenna assembly 15 from a mobile user, said signal having a plurality of uncorrelated signal paths;

ii) preferably processing said received signal 12 through a first signal processing path and a second signal processing path, said second signal processing path having a delay element 96;

iii) combining 88 said processed signal from said first signal amplification path and said second amplification path;

iv) preferably processing said processed and combined signal through a channel select filter (CSF) 100 and/or a band pass filter 103; and v) transmitting said combined signal though a transmission antenna 117.

Figure 8:
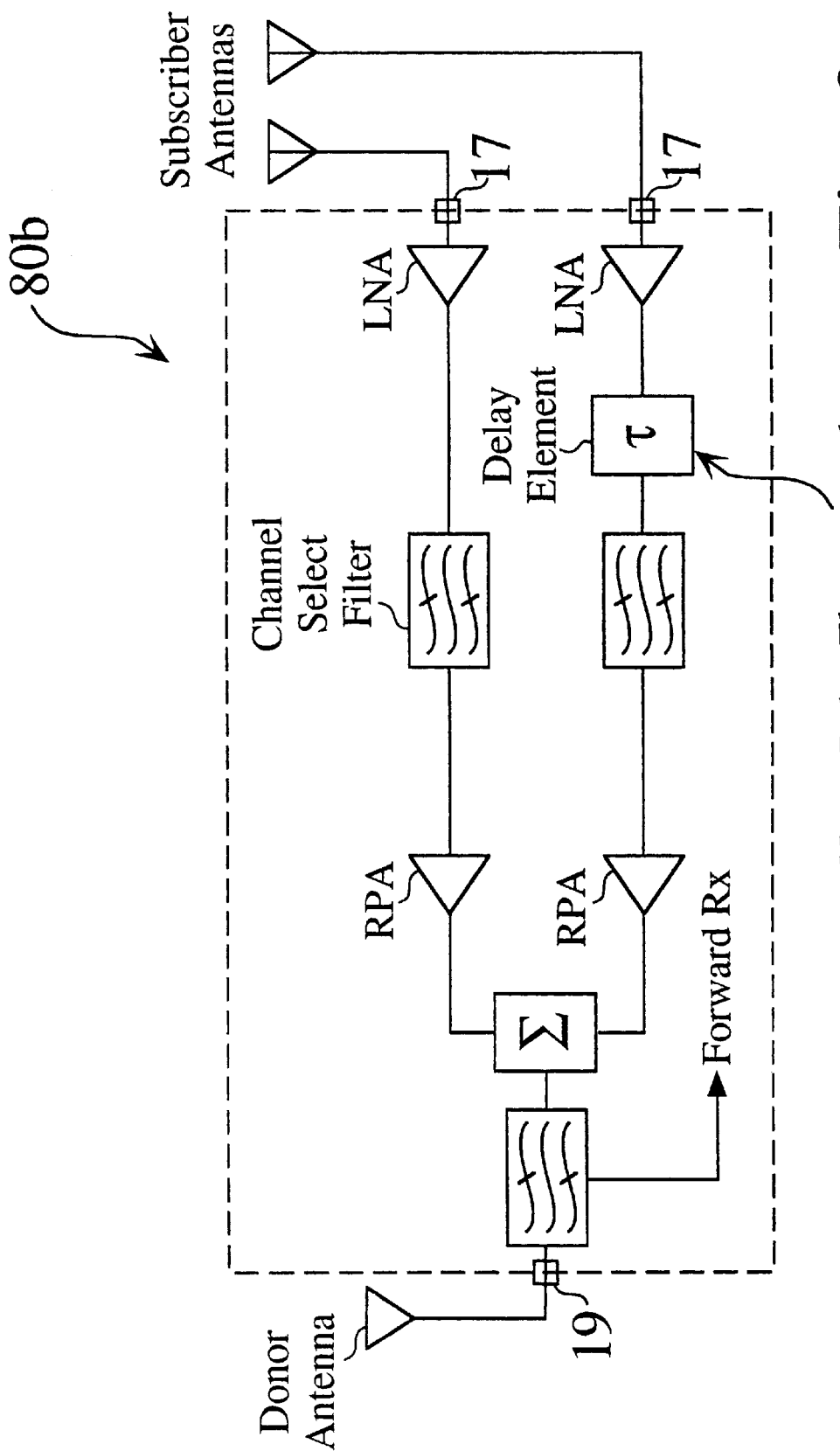
FIG. 8 is a first alternate embodiment of a diversity repeater, which has two separate complete repeater paths up to the output of the reverse power amplifier.
Figure 9:
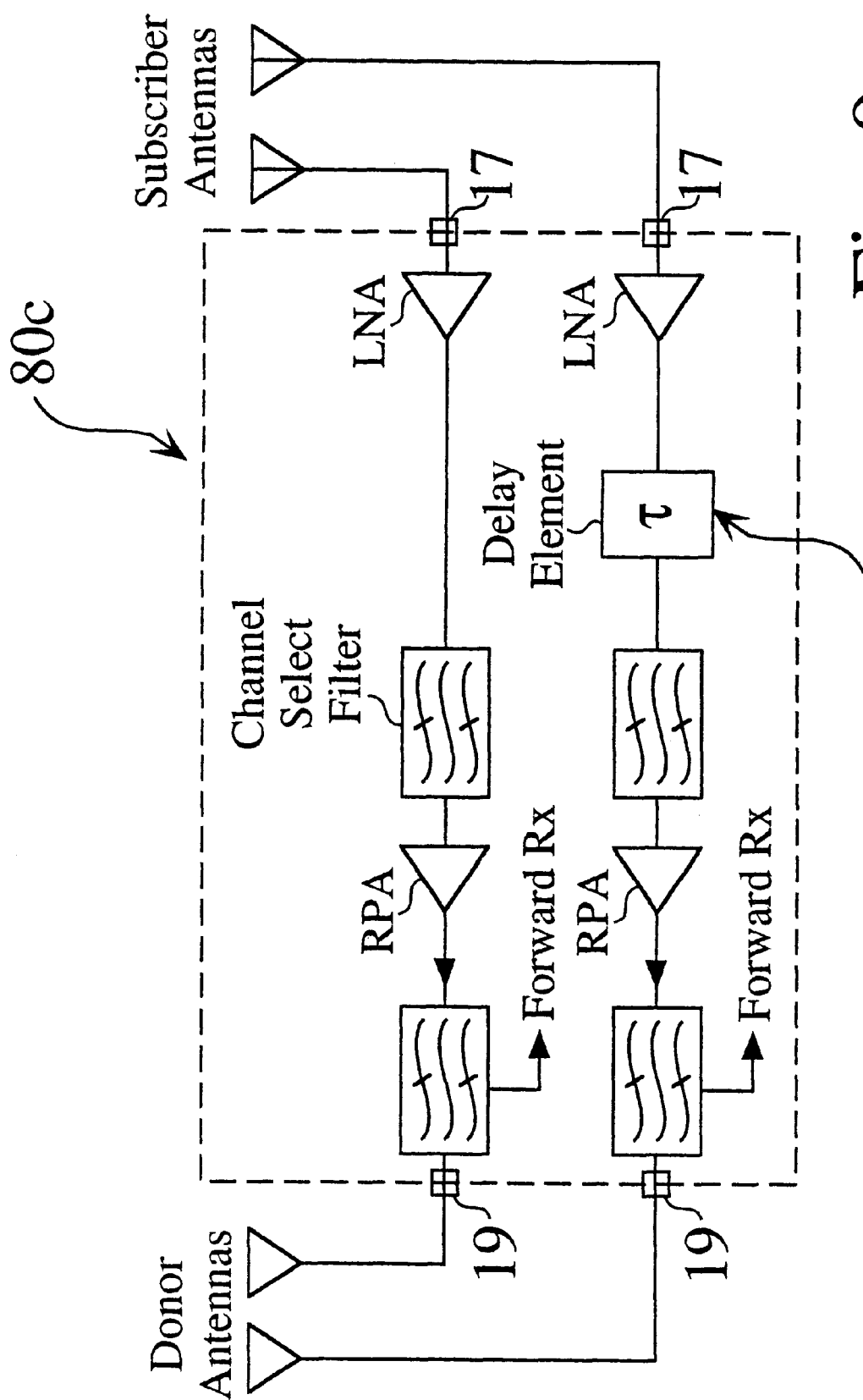
FIG. 9 is a second alternate embodiment of a diversity repeater, which has two separate complete repeater paths utilizing two donor antennas.
Figure 10:
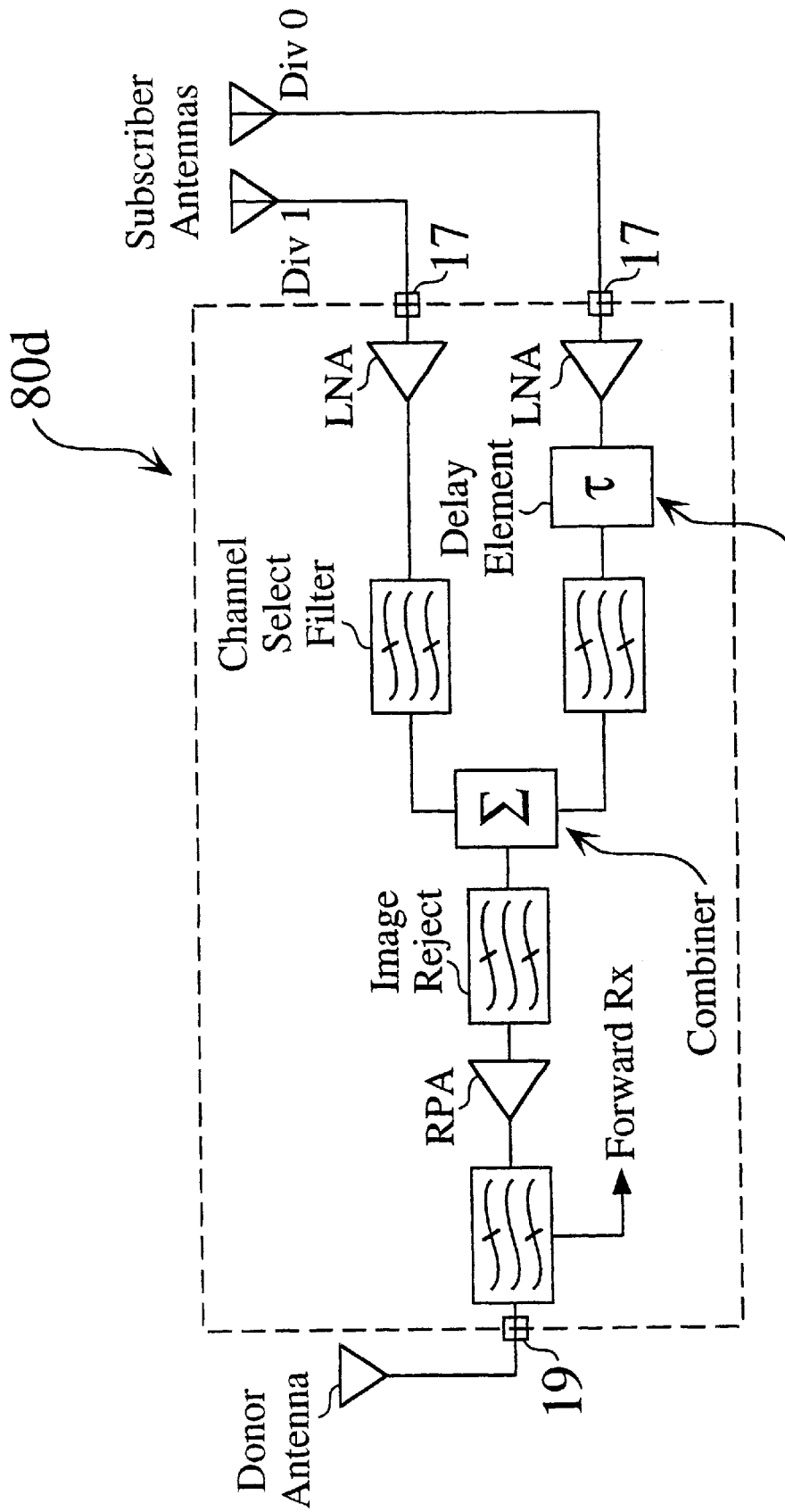
FIG. 10 is a third alternate embodiment of a diversity repeater, which has two separate complete repeater paths through the channel selective filter.

Alternate Embodiments for Diversity Repeater. There are other possible delay combining embodiments for the diversity repeater, other than the preferred embodiment. FIG. 8 shows a first alternate embodiment of a diversity repeater, which has two separate complete repeater paths up to the output of the reverse power amplifier. In this embodiment, the two paths are combined and transmitted back to a base station 39 via one donor antenna. One of the two paths introduces an extra 1.8 microsecond delay. This delay is introduced easiest within the channel select filter (CSF) module 100. FIG. 9 shows a second alternate embodiment of a diversity repeater, which has two separate complete repeater paths utilizing two donor antennas. One of the paths introduces an extra 1.8 microsecond delay. Again, this delay is introduced easiest within the channel select filter (CSF) module 100. FIG. 10 shows a third alternate embodiment of a diversity repeater, which has two separate complete repeater paths through the channel selective filter. In this embodiment, the two paths are first combined, and then are transmitted back to the base station, as in the preferred embodiment. One of these paths introduces an extra 1.8 microsecond delay. Again, this delay is introduced easiest within the channel select filter (CSF) module 100. While the alternate embodiments of the diversity repeater are generally functionally equivalent to that of the preferred embodiment, they are generally more expensive to implement.

Figure 7:
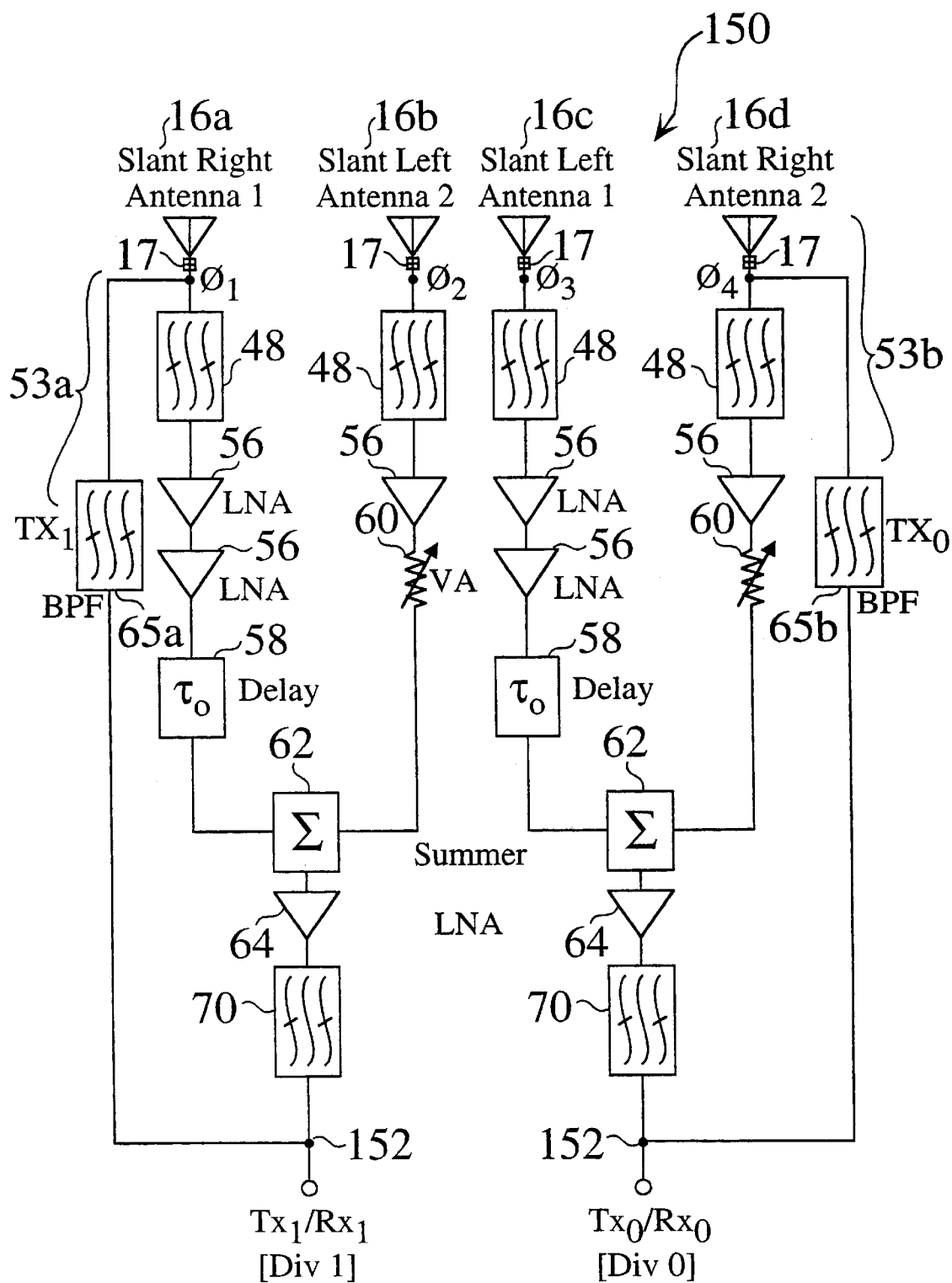
FIG. 7 is a block diagram of a quadruple diversity delay combining low noise amplifier system for base stations.

Quadruple Diversity Delay Combining Low Noise Amplification System 150 for Base Stations 39. FIG. 7 is a block diagram of a quadruple diversity delay combining low noise amplification system 150 for base stations 39 (tower-top installations or otherwise). The quadruple diversity delay combining low noise amplification system 150 for base stations 39 is a system for increasing the diversity dimensionality of a base station 39 or microcell, from two branch to four branch diversity.

The quadruple diversity delay combining low noise amplification system 150 for base stations 39 uses four antennas 16a–d in either a spatial separation configuration, a multiple polarization configuration, or a configuration that combines these two techniques, to capture four independent fading signals (paths) 12.

These four signals (paths) 12 are first filtered 48, and then amplified with one or more low noise amplifiers 56, to minimize signal to noise ratio reduction in the following stages.

A delay element 58 is used to delay the $\phi 1$ and $\phi 3$ paths, as shown in FIG. 7, which are typically delayed by a minimum of two chip periods (for one embodiment, this is greater than 1.8 microseconds). This delay is added, as described above, to allow for rake receiver demodulation of both paths. The paths associated with $\phi 1$ and $\phi 2$ are then combined with a simple 3 dB combiner 62, as are the paths associated with $\phi 3$ and $\phi 4$. Thus, the four paths are combined into two base station antenna ports.

Preferred Low noise amplifiers 64 follow each combiner 62, which are used to overcome the loss of the following SAW filter 72 (or other sharp band pass filtering device), in an effort to maintain signal to noise ratio.

This amplified signal is then preferably passed through a dual band pass filter cascade 70, comprising a SAW band pass filter 72 (or other sharp band pass filtering device) followed by another band pass filter 74, to protect the low power SAW filter from the transmitter's power. The dual band pass filter cascade 70, as discussed above, is shown in FIG. 4. The purpose of the second band pass filter 74 is to attenuate the strong RF signal from the transmitter site of the system, to protect the SAW filter from the high power RF signal of the transmitter. The first band pass filter 72 provides protection from out of band (out of receive band) interference which can result in the generation of intermodulation (IM) products. This protection greatly increases the "out of band input intercept point" of the tower top and base station cascade system configuration. Following the band pass filter cascade 70 is a junction point 152 where the receive and transmitter paths are coupled.

There is an additional path provided for the transmitter path, which comprises a band pass filter 65 and the appropriate coupling devices (junction points). The embodiment shown has two transmitter paths 53, one associated with the $\phi 1$ and $\phi 4$ receiver paths. This allows the quadruple diversity delay combining low noise amplifier system 150 to operate in a dual duplex configuration, which uses one antenna for both transmit and receive functions (a common requirement for PCS and cellular operators).

The quadruple diversity delay combining low noise amplification system 150 provides a significant increase in system reverse link sensitivity (4–5 dB), an increase in system capacity (approximately 2 dB), and an improvement in reverse link frame error performance.

Although the delay combiner system and its methods of use are described herein in connection with CDMA repeaters and delay combining amplification systems, the apparatus and techniques can be implemented within other communications devices and systems, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A code division multiple access signal repeater, comprising:
   at least two subscriber antenna connectors adapted to connect to a subscriber antenna assembly having at least two subscriber antennas, each of said subscriber antenna connectors connected to one of said subscriber antennas, each of said subscriber antennas adapted to receive independent fading decorrelated said code division multiple access signals from at least one mobile user;
   a first signal processing path and a second signal processing path for processing said received code division multiple access signals, each of said paths connected to one of said at least two subscriber antenna connectors, said first signal processing path having a delay element, said first signal processing path having a first gain, said second signal processing path having a second gain;
   means for balancing differential gain between said first gain of said first signal processing path and said second gain of said second signal processing path;
   a combiner connected to said first signal processing path and said second signal processing path, said combiner adapted to combine said processed code division multiple access signals; and
   a donor antenna connector connected to said combiner and adapted to connect to a donor antenna assembly, said donor antenna assembly adapted to transmit said processed, combined code division multiple access signal.

2. The code division multiple access signal repeater of claim 1, further comprising:
   a power amplifier connected between said combiner and said donor antenna connector.

3. The code division multiple access signal repeater of claim 1, further comprising:
   a channel select filter connected between said combiner and said donor antenna connector.

4. The code division multiple access signal repeater of claim 1, further comprising:
   means for limiting out of band interference of said processed, combined code division multiple access signal, said band limiting means connected between said combiner and said donor antenna connector.

5. The code division multiple access signal repeater of claim 1, further comprising:
   means for preserving signal to noise ratio of said processed, combined code division multiple access signal, said band limiting means connected between said combiner and said donor antenna connector.

6. The code division multiple access signal repeater of claim 1, further comprising:
   a band pass filter connected between said combiner and said donor antenna connector.

7. The code division multiple access signal repeater of claim 1, further comprising:
   means for limiting out of band interference connected between said combiner and said donor antenna connector.

8. The code division multiple access signal repeater of claim 1, wherein each of said subscriber antennas provide code division multiple access signals that are mutually decorrelated.

9. The code division multiple access signal repeater of claim 1, wherein each of said subscriber antennas in said subscriber antenna assembly are spatially separated from other of said antennas.

10. The code division multiple access signal repeater of claim 1, wherein each of said subscriber antennas in said subscriber antenna assembly are orthogonally polarized from other of said subscriber antennas.

11. The code division multiple access signal repeater of claim 1, wherein each of said subscriber antennas in said subscriber antenna assembly are spatially separated and orthogonally polarized from other of said subscriber antennas.

12. The code division multiple access signal repeater of claim 1, wherein said first signal processing path and said second signal processing path each include a low noise amplifier.

13. The code division multiple access signal repeater of claim 1, wherein said means for balancing differential gain between said first gain of said first signal processing path and said second gain of said second signal processing path comprises a variable attenuator located on said second signal processing path.

14. The code division multiple access signal repeater of claim 1, further comprising:
   a first diplexor between said first subscriber antenna connector and said first signal processing path;
   a second diplexor between said combiner and said donor antenna connector; and
   a forward path signal processing path between said second diplexor and said first diplexor, said forward path signal processing path adapted to receive forward pass signals received by said donor antenna assembly.

15. A delay combining low noise amplification system, comprising:
   at least two subscriber antenna connectors adapted to connect to a subscriber antenna assembly having at least two subscriber antennas, each of said subscriber antenna connectors connected to one of said subscriber antennas, each of said subscriber antennas adapted to receive independent fading code division multiple access signals;
   a first signal processing path and a second signal processing path, each of said paths connected to one of said subscriber antenna connectors, said first signal processing path having a delay element, said first signal processing path having a first gain, said second signal processing path having a second gain;
   means for balancing differential gain between said first gain of said first signal processing path and said second gain of said second signal processing path;
   a combiner connected to said first signal processing path and said second signal processing path, said combiner adapted to combine said processed code division multiple access signal from said first signal processing path and said second signal processing path; and a donor connector connected to said combiner.

16. The delay combining low noise amplification system of claim 15, further comprising:

a low noise amplifier connected between said combiner and said donor connector.

17. The delay combining low noise amplification system of claim 15, further comprising:

a band pass filter connected between said combiner and said donor connector.

18. The delay combining low noise amplification system of claim 15, wherein said first signal processing path and said second signal processing path each include a low noise amplifier.

19. The delay combining low noise amplification system of claim 15, wherein each of said subscriber antennas provide code division multiple access signals that are mutually decorrelated.

20. The delay combining low noise amplification system of claim 15, wherein each of said subscriber antennas in said subscriber antenna assembly are spatially separated from other of said antennas.

21. The delay combining low noise amplification system of claim 15, wherein each of said subscriber antennas in said subscriber antenna assembly are orthogonally polarized from other of said subscriber antennas.

22. The delay combining low noise amplification system of claim 15, wherein each of said subscriber antennas in said subscriber antenna assembly are spatially separated and orthogonally polarized from other of said subscriber antennas.

23. The delay combining low noise amplification system of claim 15, wherein said first signal processing path and said second signal processing path each include a low noise amplifier.

24. The delay combining low noise amplification system of claim 15, wherein said means for balancing differential gain between said first gain of said first signal processing path and said second gain of said second signal processing path comprises a variable attenuator located on said second signal processing path.

25. The delay combining low noise amplification system of claim 15, further comprising:

a first diplexor between said first subscriber antenna connector and said first signal processing path;

a second diplexor between said combiner and said donor antenna connector; and a forward path signal processing path between said second diplexor and said first diplexor, said forward path signal processing path adapted to receive forward pass code division multiple access signals received by said donor connector.

26. A process, comprising the steps of:

receiving an independent fading code division multiple access signal through at least two subscriber antenna connectors adapted to connect to a subscriber antenna assembly having at least two subscriber antennas, each of said subscriber antenna connectors connected to one of said subscriber antennas, each of said subscriber antennas adapted to receive said independent fading code division multiple access signal;

processing said received independent fading code division multiple access signal through a first signal processing path having a first gain and a second signal processing path having a second gain, each of said signal processing paths connected to one of said at least two subscriber antenna connectors;

delaying said processed code division multiple access signal on said first signal processing path;

balancing differential gain between said first gain of said first signal processing path and said second gain of said second signal processing path;

combining said processed code division multiple access signals from said first signal processing path and said second signal processing path in a combiner; and transmitting said processed and combined code division multiple access signal though a donor antenna connector adapted to connect to a donor antenna assembly.

27. The process of claim 26, further comprising the step of:

connecting a power amplifier between said combiner and said donor antenna connector.

28. The process of claim 26, further comprising the step of:

connecting a channel select filter between said combiner and said donor antenna connector.

29. The process of claim 26, further comprising the step of:

connecting a means for limiting out of band interference of said processed, combined code division multiple access signal between said combiner and said donor antenna connector.

30. The process of claim 26, further comprising the step of:

connecting a means for preserving signal to noise ratio of said processed, combined code division multiple access signal between said combiner and said donor antenna connector.

31. The process of claim 26, further comprising the step of:

connecting a band pass filter between said combiner and said donor antenna connector.

32. The process of claim 26, further comprising the step of:

connecting a means for limiting out of band interference between said combiner and said donor antenna connector.

33. The process of claim 26, wherein each of said subscriber antennas provide code division multiple access signals that are mutually decorrelated.

34. The process of claim 26, wherein each of said subscriber antennas in said subscriber antenna assembly are spatially separated from other of said antennas.

35. The process of claim 26, wherein each of said subscriber antennas in said subscriber antenna assembly are orthogonally polarized from other of said subscriber antennas.

36. The process of claim 26, wherein each of said subscriber antennas in said subscriber antenna assembly are spatially separated and orthogonally polarized from other of said subscriber antennas.

37. The process of claim 26, wherein said first signal processing path and said second signal processing path each include a low noise amplifier.

38. The process of claim 26, wherein said step of balancing differential gain between said first gain of said first signal processing path and said second gain of said second signal processing path is provided by a variable attenuator located on said second signal processing path.

39. The process of claim 26, further comprising the steps of:

providing a first diplexor between said first subscriber antenna connector and said first signal processing path;

providing a second diplexor between said combiner and said donor antenna connector; and providing a forward path signal processing path between said second diplexor and said first diplexor, said forward path signal processing path adapted to receive forward pass code division multiple access signals received by said donor antenna assembly.

* * * * *